July 9, 1935.  F. MARASSO  2,007,686
DOUGH DIVIDER
Filed March 1, 1935  3 Sheets-Sheet 1

Inventor:
Fred Marasso,
by Charles Shervey
his Atty.

July 9, 1935.　　　　　F. MARASSO　　　　　2,007,686
DOUGH DIVIDER
Filed March 1, 1935　　　　3 Sheets-Sheet 3
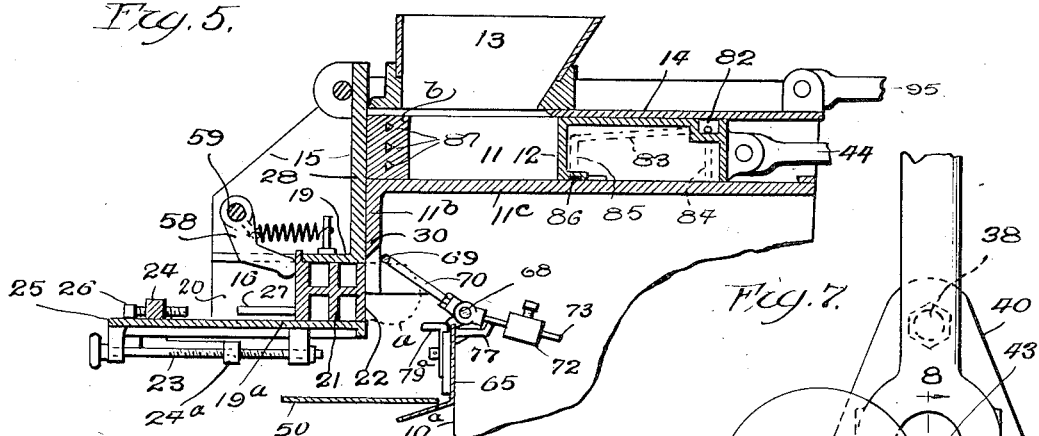
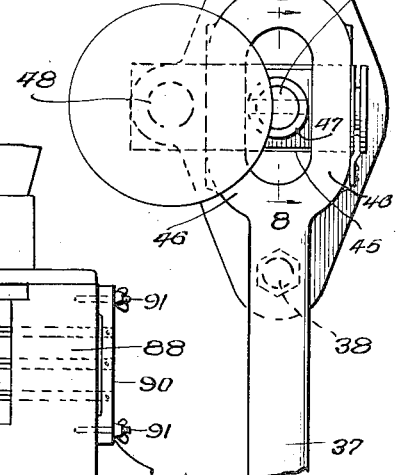
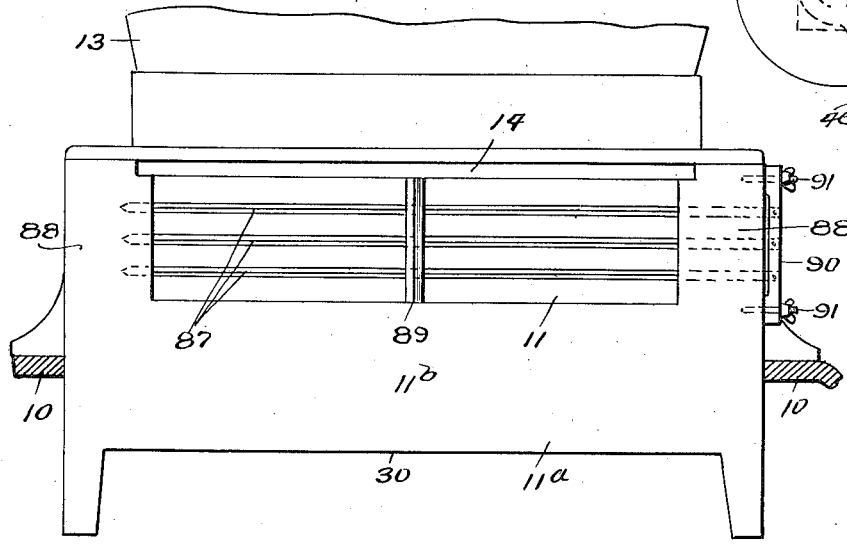
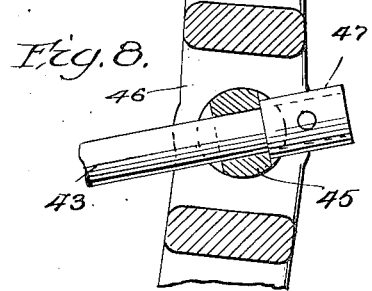
Inventor;
Fred Marasso,
by Charles O. Hervey
His Atty.

Patented July 9, 1935

2,007,686

UNITED STATES PATENT OFFICE 2,007,686

DOUGH DIVIDER

Fred Marasso, Joliet, Ill., assignor to Union Machinery Company, Joliet, Ill., a corporation of Illinois Application March 1, 1935, Serial No. 8,857

12 Claims. (Cl. 107—15)

This invention relates to dough dividers. One of the objects of this invention is to provide novel means for depositing groups of measured lumps of dough in aligned, evenly spaced relation upon a conveyor, whereby they may be conveyed in evenly spaced relation to another machine such as a rounder, for a subsequent operation. In connection with this phase of the invention the divider is provided with several measuring pockets in which the dough is divided into a group of several lumps, and ejecting plungers are provided for ejecting the lumps of dough from the several pockets. The lumps of dough are likely to stick to the ejecting faces of the plungers and usually a stationary knife or other stripper is employed to strip the lumps of dough from the faces of the ejecting plungers, but the lumps of dough are not thereby simultaneously stripped from the plungers so as to fall simultaneously, but one or more are likely to cling to the knife longer than others, the result being that they drop at different times upon the traveling conveyor and sometimes one lump is likely to fall upon another, which necessitates the presence of an attendant to properly space them apart on the conveyor.

In accordance with the present invention means are provided for dropping the measured lumps of each group, simultaneously in aligned, evenly spaced relation.

Another object of the invention is to provide novel means for regulating the pressure exerted by the ram or charging plunger on the dough when filling the measuring pockets. Another object is to provide novel means for lubricating the ram or charging plunger.

Another object is to provide means to prevent any excess dough, remaining in the charging chamber, from being drawn back by the ram, whereby dough may enter the charging chamber between the excess remaining dough and the ram.

Other objects and advantages will appear in the course of the specification and with said objects and advantages in view, this invention consists in the several novel features hereinafter fully set forth and claimed.

The invention is clearly illustrated in the drawings accompanying this specification in which:

Fig. 5 is a vertical, longitudinal section, partly broken away, taken on the line 5—5 of Fig. 3 and showing the lump measuring head at its discharge position, and the knife and ram at their retracted position;

Fig. 6 is a view partly in front elevation and partly in vertical cross section taken on the line 6—6 of Fig. 1;

Fig. 7 is a detail fragmental rear elevation of the plunger lever looking in the direction of the arrow 7 in Fig. 1, and Fig. 8 is a detail, fragmental section taken through the plunger lever taken on the line 8—8 of Fig. 7.

Figure 1:
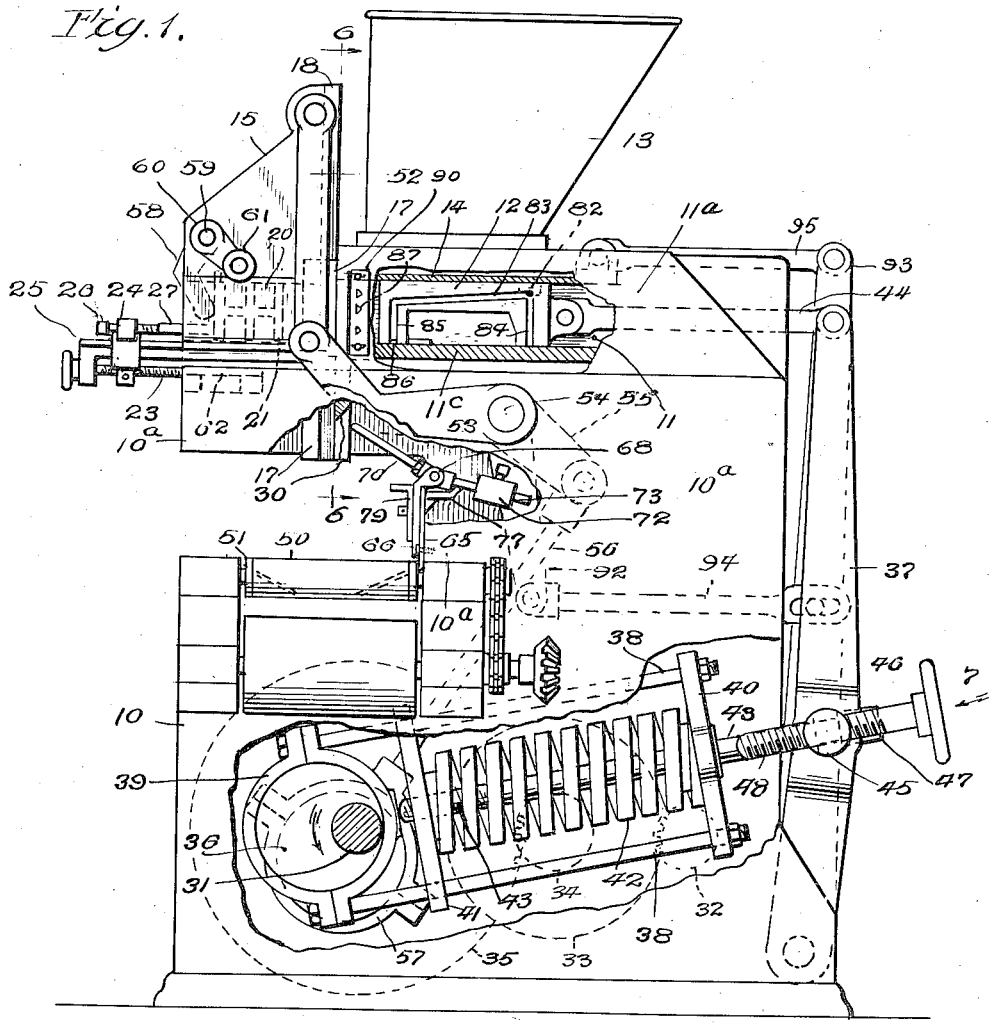
Fig. 1 is a side elevation partly broken away, of a dough divider embodying a simple form of the present invention, certain details of the machine, unconnected with the present invention, being omitted.
Figure 2:
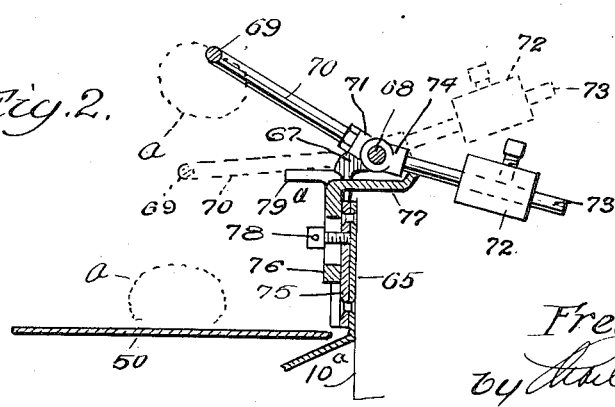
Fig. 2 is a detail vertical cross section through the lump spacing mechanism taken on the line 2—2 of Fig. 3.
Figure 3:
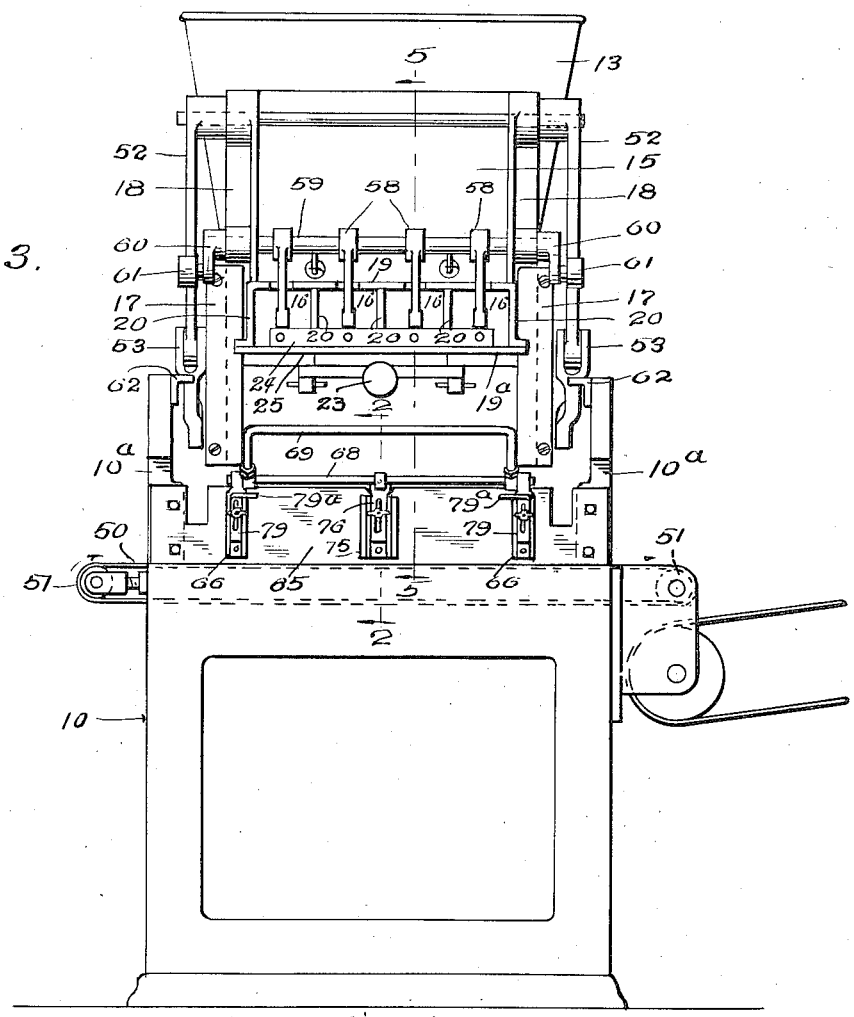
Fig. 3 is a front elevation of the divider, with parts, unconnected with the invention, omitted.
Figure 4:
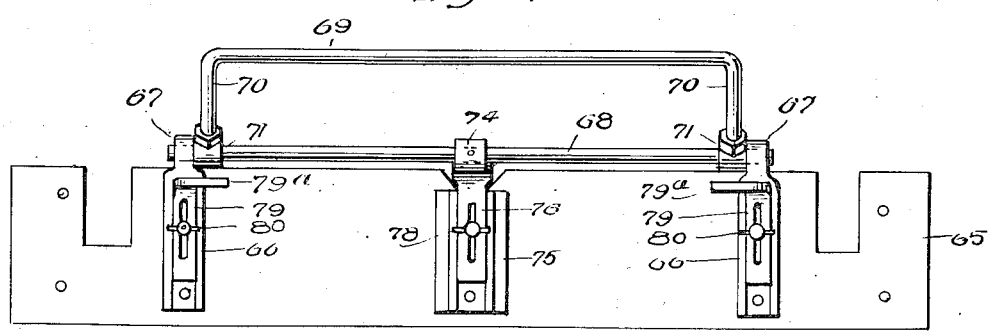
Fig. 4 is a detail front elevation of the lump centering and spacing device.

Referring to said drawings, the reference character 10 designates the supporting frame of the divider, which in the main, is of rectangular form, and carries the operating mechanism of the machine. In the upper end of the frame is a rectangular charging chamber 11 in which is reciprocated a ram or charging plunger 12, and above the charging chamber is a hopper 13 supported by the casing 11a for the charging chamber. Said casing is mounted on the supporting frame. The bottom of the hopper communicates with the charging chamber through an opening which is controlled by a reciprocating knife 14 as usual in dividers of this type. Mechanism is provided for reciprocating the ram and knife as will presently appear.

At the discharge end of the charging chamber is a movable head 15, having measuring pockets 16 into which the ram forces the dough. A vertically reciprocating head is shown, but it is to be understood that any of the common and well known measuring heads now in use, may be substituted therefor. Guides 17 for the head are provided on the frame, and said guides are provided with vertical grooves or guideways in which are guided flanges 18 formed on the head. Mechanism is provided for reciprocating the head in timed relation to the ram as will presently appear.

The head is divided into several measuring pockets 16 by top and bottom walls 19, 19a and upright walls 20 and in said pockets are reciprocable ejecting plungers 21 against which the dough is forced and the faces 22 of said plungers form the rear or end walls of the measuring pockets and determine the capacity of the pockets.

Adjustment means are provided for determining the limit of movement of the plungers in the pockets as is customary. Briefly the adjustment means shown comprises a cross bar 24 slidably mounted on a table 25 and adjusted back and forth thereon by an adjustment screw 23 rotatively mounted in lugs depending from the table 25 and threadedly mounted in a lug 24ª depending from the cross bar 24. The cross bar serves to stop the ejecting plungers at the predetermined limit of their backward movement, and for individually regulating the back stroke of the plungers, adjustment screws 26 are provided in the cross bar 24 which are arranged to be encountered by pins or lugs 27 that project back from the plungers. Fig. 1 shows the ejecting plungers at the rear limit of their stroke and the ram practically at the end of its charging stroke. Fig. 5 shows the ejecting plungers at the limit of their ejecting stroke.

At the front of the head 15 is a vertical wall 28, having openings therein through which the dough is forced into the measuring pockets. Contiguous with the wall 28, a wall 11ᵇ projects down from the bottom wall 11ᶜ of the charging chamber. The wall 11ᵇ closes the front ends of the pockets when the head is moved down and holds the dough therein until the pockets are moved below the wall 11ᵇ. At the lower edge of the wall 11ᵇ is a knife edge 30 which serves to strip the dough lumps from the faces of the plungers when the lumps have been discharged from the pockets and while the head is being moved upwardly (see Fig. 5). The construction and operation of the parts above described are common and well known and require no further description so far as this specification is concerned.

The means for reciprocating the ram and measuring head will now be described.

Journaled in suitable bearings carried by the frame is a shaft 31 driven from a main drive shaft, as by a train of gears 32, 33, 34, 35 or other suitable gearing. On said shaft 31 is an eccentric 36 or other motion converting device, to which is connected a spring shackle for rocking a plunger lever 37 through strokes of regulated limits. As shown this spring shackle comprises two parallel rods 38 connected at one end to the strap 39 of the eccentric and at the other end to a spring saddle 40. Slidably carried by the rods 38 is an adjustable second spring saddle 41 and interposed between said spring saddles is a strong compression spring 42 which exerts pressure, tending to spread the spring saddles apart. Threadedly or otherwise adjustably secured in the adjustable spring saddle 41 is a draw rod 43 which extends through the spring saddle 40 and slides therethrough and is connected to the lever 37, the upper end of which is connected to the ram by a link 44. The lever has a slot (see Fig. 7) across which extends a pin 45 which is rotatively mounted in the two sides 46 of the lever which enclose the slot. The draw rod has a lost motion connection with the lever 37, and as shown extends through this pin 45 and has a head such as a collar 47 rigidly fastened on its outer end, which is arranged to engage a flattened portion of the pin in a direction to swing the lever 37 through the charging stroke of the ram. The tension of the compression spring 42 is exerted between the spring saddles and acts on the spring saddle 41 to draw the draw rod 43 to the left, as viewed in Fig. 1, thereby tending to pull the lever 37 toward the left and therewith force the ram against any dough contained in the charging chamber under great pressure. The eccentric 36 forms a stop limiting movement of the draw rod toward the left. The amount of pressure which it is desired to place on the dough is regulated by the draw rod. By turning up the draw rod and screwing it farther through the spring saddle 41, more tension is applied to the compression spring and as a result greater pressure is applied to the dough.

As above stated the draw rod pulls the plunger lever through its charging stroke. The spring saddle 40 acts to swing the lever through its back stroke, that is through the suction stroke of the ram, and an adjustment screw 48 is threadedly mounted in the pin 45 of the plunger lever, against which the spring saddle 40 may bear. The adjustment screw 48 provides means whereby the length of the back stroke may be regulated whereby the capacity of the charging chamber may be varied to control the amount of dough admitted thereto in proportion to the amount to be charged into the measuring pockets. For measuring small lumps of dough, less back stroke of the lever is required than when measuring large lumps. By properly manipulating the adjustment screw 48 the extent of the back stroke of the lever and ram can be accurately determined. The extent of the back stroke is determined by a lost motion connection between the spring saddle 40 and the adjustment screw 48. In Fig. 1 the eccentric 36 is shown in a position about to pass the dead centre about the shaft. It will be seen that there is a gap between the spring saddle 40 and the adjustment screw 48. As the eccentric continues to rotate from the position shown, the rods 38 are moved toward the right, the spring expands, forcing the spring saddle 40 toward the right, inasmuch as there is no movement of the draw rod and spring saddle 41 at the commencement of the movement, but when the spring saddle 40 encounters the adjustment screw 48, it swings the lever 37 back, retracting the ram and drawing back the draw rod and spring saddle 41. The entire spring shackle then moves as a unit. When the eccentric again passes the dead centre and continues its cycle of rotation, it swings the lever forward through the instrumentality of the spring shackle and as a result the ram is moved forward through its charging stroke forcing dough into the measuring pockets under pressure.

Below the measuring head 15 is a conveyor 50, here shown as an endless apron or belt trained around sheaves 51 journaled at the sides of the machine and driven from any suitable source of power. The belt extends parallel with the row of measuring pockets in the measuring head, so that the lumps of dough may be deposited thereon in a row along its length. The measuring head is reciprocated by links 52, pivotally connected to the head near its upper end and connected at their lower ends to levers 53 mounted on a rock shaft 54 journaled in the frame of the machine and having an arm 55 mounted thereon, connected by a link 56 to an eccentric 57 on the shaft 31. The eccentrics 36, 57, are timed to start the measuring head down approximately at the time the ram is completing its charging stroke, and to start the head up at or before the ram commences its charging stroke.

Fingers 58 mounted on a rock shaft 59 rotatively mounted in the measuring head and engaging the rear faces of the ejecting plungers 21 are provided for moving the plungers through their ejecting stroke as the head approaches the lower limit of its stroke whereby to eject the dough lumps from the measuring pockets. Arms 60 on the ends of the rock shaft 59 and having rollers 61 on their ends are adapted to encounter stops 62 on the frame of the machine, near the conclusion of the down stroke of the measuring head. When the rollers encounter the stops and the measuring head continues its downward movement, the fingers are swung forward thereby moving the ejecting plungers to the forward limit of their stroke.

The dough lumps being more or less sticky, they cling to the front faces of the plungers after having been ejected from the pockets. When the measuring head starts upward the knife 30 strips the dough lumps from the plunger faces, but without the present improvement the dough lumps are very likely to cling to the knife and drop at different times.

For depositing the dough lumps on the endless conveyor in alignment at regularly spaced places thereon centering and spacing mechanism is provided between the measuring head and conveyor which embodies a horizontal rod or other spacing member to which the dough lumps adhere and from which they are jarred loose simultaneously. The centering and spacing mechanism shown will now be described. Supported by the side members 10a of the frame is an upright plate 65 which stands parallel with the endless conveyor. The plate forms the supporting means for the centering and spacing mechanism. Riveted or otherwise secured to one face of the plate 65 are brackets 66 formed at their upper ends with ears 67 in which is journaled a rock shaft 68. Rigidly supported by the rock shaft 68 is a lump spacer here shown as a horizontal rod 69 or other like member having arms 70 bent up from the rod 69 and fastened to the rock shaft by socket members 71 rigid with the arms and rock shaft. A counter weight 72 is connected with the rock shaft as by an arm in the form of a rod 73 rigidly secured to the rock shaft by a socket member 74. The counter weight is adjustably mounted on the rod 73 as by a set screw, whereby the lump spacer may be accommodated to lumps of different weights.

Adjustably mounted on a bracket 75 fastened to the supporting plate, is a stop member 76 which has a finger 77 on its upper end that projects back of the plate in position to be encountered by the counter weight rod 73. The stop member 76 is secured upon the bracket 75 by a thumb screw 78 that extends through a slot in the stop member and is threadedly held in the bracket. The purpose of the stop member is to locate the rod 69 of the lump spacer with respect to the edge of the knife 30. By raising the stop member the lump spacing rod is lowered and vice versa, if the stop member is lowered the rod is raised. Normally the counter weight holds the lump spacing rod in the adjusted position adjacent the knife.

Adjustably supported on the brackets 66 are other stop members 79 similar to the stop member 76 except that their fingers 79a project forward from the plate 65 in position to be encountered by the arms 70 of the lump spacer whenever the latter is swung down. The stop members 79 are fastened to the brackets 66 by thumb screws 80 that extend through slots in the stop members and are threaded in the brackets 66. The purpose of the adjustment of the brackets 79 is to stop the lump spacing bar while swinging down and outwards from the plate or to stop it at or after it has passed a horizontal plane passing through the axis of the rock shaft, so as to deposit the dough lumps approximately along the centre line of the endless conveyor, regardless of the size and weight of the lumps.

In the operation of the spacing mechanism, as the dough lumps (a) have been ejected from the measuring pockets (see Fig. 5) and the measuring head is moving upward and the lumps are being stripped from the faces of the ejecting plungers by the knife 30, the lumps encounter the lump spacing rod 69, whereby they are pressed upon the rod and by reason of their sticky nature they cling to the rod after they have been stripped from the ejecting plungers. The weight of the several dough lumps overbalances the counter weight and consequently the dough lumps swing the lump spacing rod down. Considerable momentum is acquired during the fall of the lump spacing rod with the lumps clinging thereto, and when the arms of the rod suddenly strike upon the stop fingers 79a, the several dough lumps are simultaneously jarred loose from the lump spacing rod and as a result are deposited, evenly spaced upon the endless conveyor along the middle line thereof.

The end lumps of the group seem to be spread out slightly along the lump spacing rod. This has the effect of closing up the gaps (more or less) between the adjacent groups of dough lumps so that the entire series are spaced more evenly than has been done without the spacing device.

It will be observed from the above that the dough lumps of a group cling to the lump spacing rod until they are jarred therefrom by reason of the spacing member coming to a sudden stop. When the dough lumps release their hold on the lump spacing rod, the counter weight immediately restores it into position for action on the next succeeding group of measured dough lumps. The lump spacer may of course assume various forms as is well understood, and may oscillate or reciprocate in its movement to deposit the dough lumps in evenly spaced relation on the endless conveyor. While I have shown and described a gravity actuated centering and spacing device, I do not wish to limit myself to one that is actuated by gravity.

The ram slides in the charging chamber and in order to provide lubrication between the ram and the walls along which it travels, I provide an oil reservoir 82 in the upper side of the ram which is filled with a vegetable lubricating oil. From the ends of the reservoir lead oil ducts that connect with inclined grooves 83, and upright grooves 84 in the side faces of the ram. The inclined grooves terminate in upright grooves 85 and the upright grooves are connected at their lower ends by crosswise extending grooves 86. The oil flows along the grooves and is applied to the sides and bottom walls of the charging chamber and ram. It has been found that pieces of dough are caught in the reservoir and are rolled along the under surface of the knife thereby supplying lubrication between the ram and knife.

An excess amount of dough is usually drawn into the charging chamber by the ram on its back strokes, and when the measuring pockets have been filed this excess dough (b) is left in the space between the pockets and the front face of the ram. To prevent this dough from being drawn back with the plunger, I provide several rods or bars 87 (see Figs. 5 and 6) across the charging chamber adjacent its discharge end and spaced a short distance beyond the entrance to the pockets. The rods 87 are held in the side walls 88 of the charging chamber and in an upright spacing bar 89 disposed between the end walls. The bars are desirably triangular in cross section with one apex directed toward the ram. The ram forces the dough through the spaces between the rods and into the measuring pockets, and a solid body of dough builds up behind the bars, thereby embedding the bars in the dough. When the ram is retracted the bars hold this dough back, thereby preventing it from following the plunger and as a result, dough from the hopper, is drawn into the space between the excess dough in the charging chamber and the front face of the plunger. The excess dough is therefore always charged into the measuring pockets in advance of the new charge.

For the purpose of cleaning the parts behind the rods, they are made removable. As shown they are attached to a cross piece 90 at one end which is removably fastened to the side wall 88 by stud screws and nuts 91.

The knife 14 which controls the opening from the hopper to the charging chamber is reciprocated by connecting mechanism driven from the eccentrics 57 and as shown comprises an arm 92 on the rock shaft 54, a knife actuating lever 93 connected thereto by a link 94 and a link 95 connecting the lever 93 with the knife 14. The timing of the knife 14 and ram 12 is desirably such that the knife closes the opening from the hopper to the charging chamber in advance of the charging stroke of the ram, and begins to uncover the opening just prior to end of the charging stroke, thereby permitting any excess of dough not required to be left in the charging chamber, to be squeezed back into the hopper. This timing is obtained by adjusting the eccentrics upon the shaft.

The operation of the divider has been explained in connection with the description of the machine, and it is believed that the operation is fully understood from the above description.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. The combination with a dough divider having several measuring pockets, plungers therein for ejecting a group of dough lumps therefrom, and a conveyor below the pockets, of a lump spacer having means arranged to receive a group of dough lumps from the pockets and deposit them simultaneously on the conveyor.

2. The combination with a dough divider having a measuring head provided with several measuring pockets from which a group of dough lumps are simultaneously ejected, and a conveyor below the pockets, of a combined lump centering and spacing device having a member arranged to receive a group of dough lumps from the pockets, and means for guiding said member for movement toward the median line of the conveyor, whereby to deposit the group of dough lumps along the median line of the conveyor in evenly spaced relation.

3. The combination with a dough divider having several measuring pockets, plungers therein for ejecting a group of dough lumps therefrom, and a conveyor below the pockets, of a lump spacer having a lump spacing member against which the ejected group of dough lumps are impinged, and means for guiding the lump spacing member for movement toward the conveyor.

4. The combination with a dough divider having several measuring pockets, plungers therein for ejecting a group of dough lumps therefrom, and a conveyor below the pockets, of a lump spacer having an oscillatory lump spacing member against which the ejected group of dough lumps are impinged, and stop members for limiting the extent of movement of the lump spacing member.

5. The combination with a dough divider having several measuring pockets, plungers therein for ejecting a group of dough lumps therefrom, and a conveyor below the pockets, of a lump spacer having an oscillatory gravity actuated lump spacing rod against which the ejected dough lumps are impinged, means for holding said lump spacing rod in position to receive a group of dough lumps, and stop members for suddenly stopping the lump spacing rod when moved down under the influence of gravity whereby the dough lumps are simultaneously jarred therefrom.

6. The combination with a dough divider having several measuring pockets, plungers therein for ejecting a group of dough lumps therefrom, and a conveyor below the pockets, of a lump spacer having an oscillatory lump spacing member against which the group of dough lumps are impinged, and movable to a discharging position.

7. The combination with a dough divider having several measuring pockets, plungers therein for ejecting a group of dough lumps therefrom, and a conveyor below the pockets, of a lump spacer having a dough spacing member against which the dough lumps are impinged and means for simultaneously discharging the group of dough lumps from said dough spacing member.

8. The combination with a dough divider having several measuring pockets, plungers therein for ejecting a group of dough lumps therefrom, and a conveyor below the pockets, of a lump spacer having an oscillatory gravity actuated dough spacing member, supporting brackets in which said dough spacing member is rotatively mounted, a counter weight for said member, and stop members for limiting the extent of movement of said member.

9. The combination with a dough divider having several measuring pockets, plungers therein for ejecting a group of dough lumps therefrom, and a conveyor below the pockets, of a lump spacer having a gravity actuated lump spacing rod, supporting arms therefor, a counter weighted arm, a rock shaft to which said rod supporting arms and counter weighted arm are rigidly secured, and stop members for limiting the extent of movement of said lump spacing rod.

10. The combination with a dough divider having several measuring pockets, plungers therein for ejecting a group of dough lumps therefrom, and a conveyor below the pockets, of a lump spacer having a supporting plate, brackets supported thereon, a rock shaft rotatively mounted in said brackets, a bail like dough spacing member secured to said rock shaft and a counter weighted arm secured to said shaft.

11. In a dough divider, a reciprocating measuring head containing several measuring pockets, and reciprocatory lump ejecting plungers in said pockets, a stationary knife co-operating with said plungers to strip measured lumps of dough therefrom, and a conveyor below the pockets, in combination with a lump spacer having a movable lump spacing means that is encountered by the ejected dough lumps, and serving to lower said dough lumps, and means operating to simultaneously release the dough lumps from said lump spacing means, whereby they are deposited simultaneously upon the conveyor.

12. In a dough divider, a reciprocatory measuring head containing several measuring pockets, and reciprocatory lump ejecting plungers in said pockets, a stationary knife co-operating with said plungers to strip measured lumps of dough therefrom, and a conveyor below the pockets, in combination with a lump spacer having an oscillatory, gravity actuated lump spacing means that is encountered by the ejected dough lumps, and to which the ejected dough lumps cling when stripped from the plungers, the combined weight of said ejected dough lumps serving to swing the lump spacing means downward, and means serving to stop the downward swing of the lump spacing means, before the lumps encounter the conveyor, whereby the dough lumps are simultaneously released from the lump spacing means and simultaneously deposited on the conveyor in spaced relation.

FRED MARASSO.